Sept. 15, 1970    I. C. MILES ET AL    3,528,632
HIGH LIFT FLAPS FOR AIRCRAFT

Filed May 14, 1968    2 Sheets-Sheet 1

United States Patent Office 3,528,632
Patented Sept. 15, 1970

3,528,632
HIGH LIFT FLAPS FOR AIRCRAFT
Ian Chichester Miles, Harpenden, and Peter Martin Herbert Putman, Welwyn Garden City, England, assignors to Hawker Siddeley Aviation Limited, Kingston-upon-Thames, Surrey, England, a British company
Filed May 14, 1968, Ser. No. 729,097
Claims priority, application Great Britain, May 16, 1967, 22,778/67
Int. Cl. B64c 9/20
U.S. Cl. 244—42                                7 Claims

ABSTRACT OF THE DISCLOSURE

A high lift flap assembly is provided for an aircraft in which a main flap is carried by rollers running in guide channels and is extended by endless chains. The flap has a rear edge tab which is extended by endwise movement of a rod; simultaneous turning of the rod causes a cranked end thereon to deflect the tab with respect to the flap.

DESCRIPTION OF INVENTION

This invention relates to high lift flaps for aircraft.

High lift flaps are well known which comprise a main flap that can be extended from the trailing edge of the wing and deflected downward, and wherein a tab is provided at the trailing edge of the main flap which tab is normally an undeflected rearward continuation of the main flap but becomes separated from the flap to form a slot and is deflected downward with respect to the flap when the flap is at full extension. Normally, there is a position somewhat short of full extension of the flap in which the flap is deflected downward but the tab is still unseparated from, and undeflected with respect to, the main flap, and a position of full extension in which the flap is deflected further downward and the tab is both separated from and deflected downward still further than the main flap.

The mechanism to produce these movements is usually somewhat complicated and tends to project beyond the wing profile. On large aircraft the situation has been tolerable but it has been found that for smaller aircraft such mechanisms do not scale down well and any external fairings enclosing protruding parts of the mechanism are far less acceptable. It is therefore an object of the invention to provide a simpler mechanism which can be readily employed on the smaller aircraft.

According to the invention, both the flap and the tab are extended by means of mechanical push-pull members, each in the form of a rod in the case of the tab, and a chain, cable or rod in the case of the flap, and the deflection of the tab with respect to the flap is brought about by turning of the tab-extending push-pull rod about its longitudinal axis. For this latter purpose the rod may have a mounting on the flap structure which allows the rod to move endwise but causes it to turn as it does so. If the connection of the rod to the tab is by means of an appropriately arranged cranked extension of the rod, the tab can be made to separate from the flap and simultaneously deflect as the rod is moved endwise.

In the preferred arrangement, endwise movement of the push-pull rod actuating the tab is brought about automatically at full extension of the flap by engagement of an abutment surface on the wing structure and a lever arm operatively connected to the rod.

One form of construction in accordance with the invention will now be described by way of example with reference to the accompanying drawings, in which.

Figure 1:
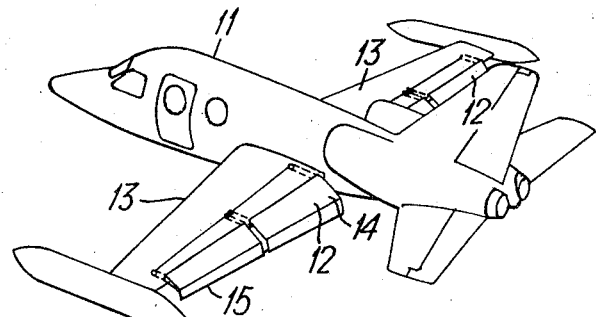
FIG. 1 is a pictorial view of an aircraft fitted with high lift flaps.
Figure 3:
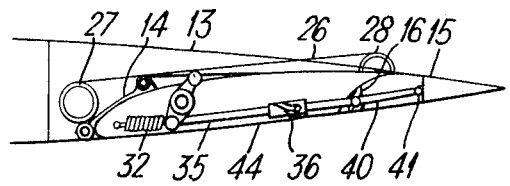
FIGS. 3, 4 and 5 show the flap stowed and in two conditions of extension.
Figure 4:
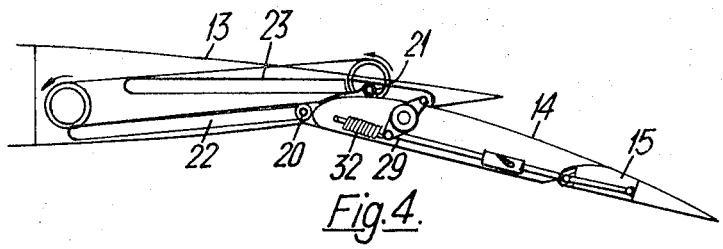
Figure 5:
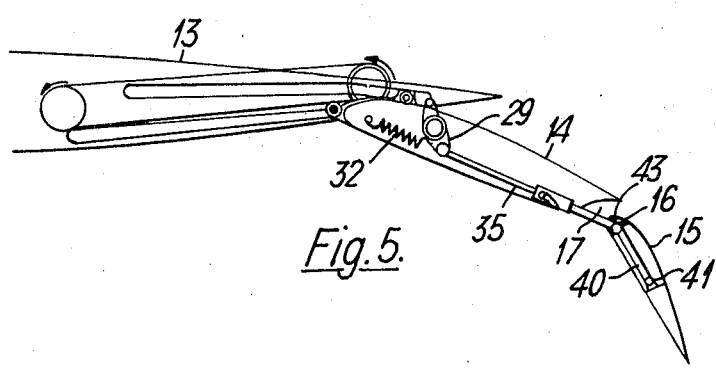

FIG. 1 shows a small civil passenger aircraft 11 equipped with high lift flap assemblies 12 along substantially the whole of the trailing edge of each wing 13. Each flap assembly 12 comprises a main flap 14 which can be moved from a stowed position, in which it is buried in the trailing portion of the wing as shown in FIG. 3, to rearwardly extended and downwardly deflected positions as shown in FIGS. 1, 2, 4 and 5. Hinged on the trailing edge of the flap 14 is a tab 15 which is aligned with the trailing edge of the wing 13 and has its nose 16 close against the flap 14 when the flap is retracted, as in FIG. 3, but moves to a position some distance apart from the flap to form a slot 17, and is deflected downwardly with respect to the flap 14, when the flap is fully extended as in FIG. 5. FIG. 4 shows the take-off position with the flap 14 extended and deflected but not quite to its full extent; in this position the tab 15 is not separated from or deflected with respect to the flap 14 but forms a rearward continuation or trailing edge of the flap. FIG. 5 shows the landing position with the flap 14 and tab 15 both fully extended and deflected.

Figure 2:
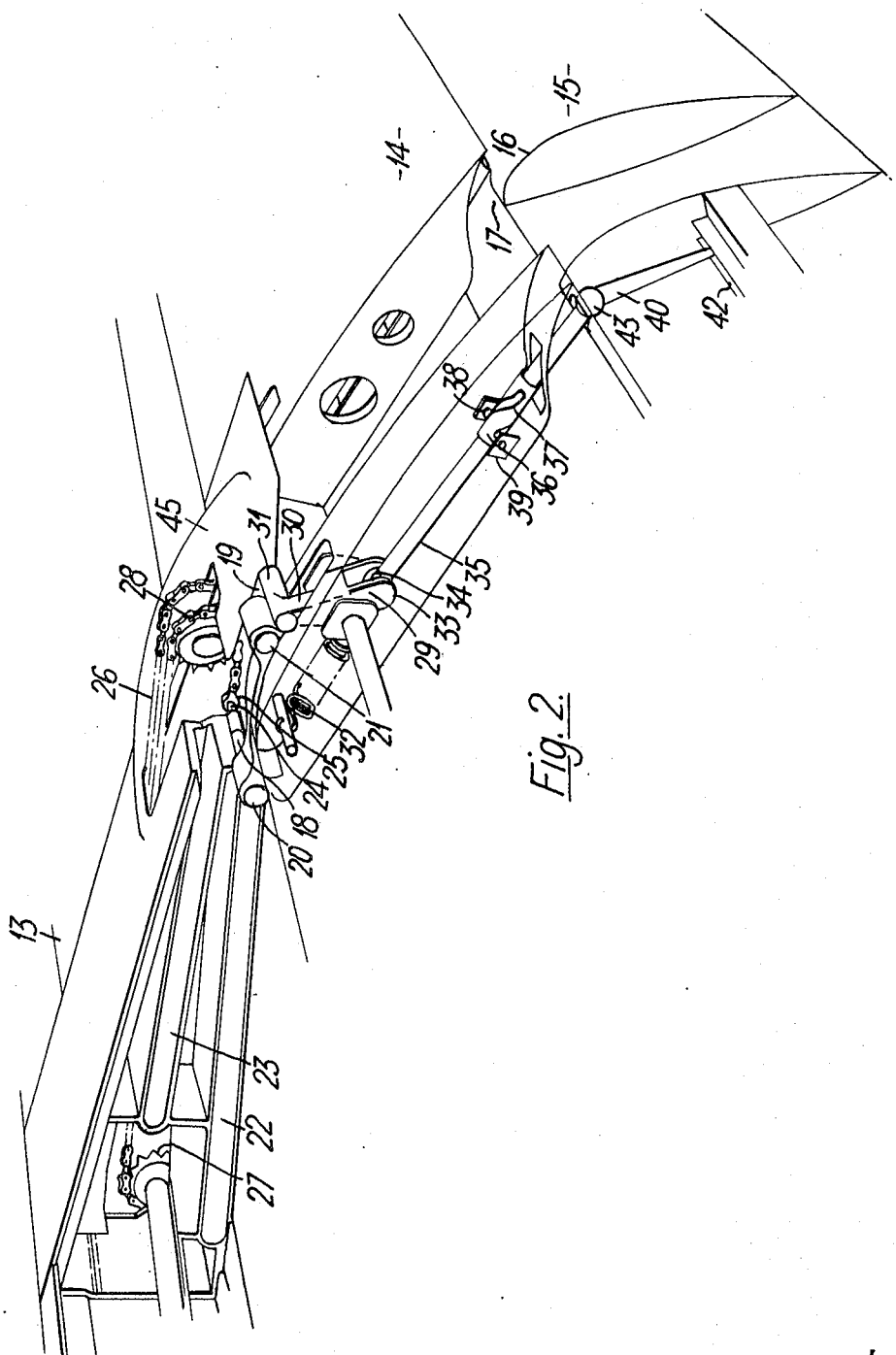
FIG. 2 is a pictorial presentation, with parts broken away, of a flap assembly and its operating mechanism.

Referring to FIG. 2, the main flap 14 is attached to the wing 13 by means of two sets of rollers 18, 19 which are carried on two sets of transverse pins 20 and 21, the pins 20 being at the nose of the flap 14 while the pins 21 are at the top of the flap a short distance back from the nose. The rollers 18 on the pins 20 run fore-and-aft in lower channels 22 in the wing 13 while the rollers 19 run in upper channels 23. Each of the pins 20 has an extension 24 beyond the roller 18 thereon which extension is received in a special link 25 forming part of an endless drive chain 26 trained around forward and aft sprockets 27, 28 mounted on the wing structure near the forward and after ends, respectively, of the roller guide channels 22 and 23. Thus, by operation of the chains 26 the main flap 14 can be pulled to any desired position between fully extended and fully housed in the wing.

The flap 14 contains a mechanism which serves both to extend and to deflect the tab 15. Double-armed crank levers 29 are each mounted in a forward region of the flap 14 to turn in a fore-and-aft vertical plane; each has an upper arm 30 provided with a laterally-extending crank pin 31 that slides in the upper guide channel 23 quite close behind the roller 19 on the pin 21. Normally the lever 29 is held in the position shown in FIG. 3 by a tension spring 32 acting on its lower arm 33 but on full extension of the flap 14 the crank pin 31 encounters the rear end of the channel 23 which results in the lever 29 turning anti-clockwise against the action of the spring 32 into the angular position shown in FIGS. 2 and 5.

Pivotally connected by a ball joint 34 to the lower arm 33 of the lever 29 is a push rod 35 which extends rearwardly and carries intermediate its ends a sleeve 36 fast therewith. The sleeve 36 has helical slots 37 formed in it which receive pins 38 that constitute part of a mounting 39 on the flap structure for the rod 35. The result is that endwise movement of the rod 35 is accompanied by turning of the rod about its longitudinal axis by reason of the engagement of the pins 38 in the helical slots 37. At its rearward end the rod 35 has an extension 40 passing into the tab 15 and set at an angle to the main part of the rod 35. The extension 40 terminates in a ball end 41 which slides in a horizontal transverse channel 42 in the tab structure. The nose of the tab 15 is attached to the rear end of the main portion of the rod 35 by a ball joint 43 and endwise movement of the rod shifts the tab 15 rearward away from, or forward up to, the flap 14.

Normally, i.e. when the flap 14 is retracted, the rod 35 and its extension 40 lie in a common plane which is parallel to the general plane of the local under-surface 44 of the wing 13, as best seen in FIG. 3. Upon rearward movement of the rod 35 due to the crank lever 29 encountering the rear end of the channel 23 when the flap is extended, the turning of the rod brings the common plane of the rod and its extension 40 into the vertical, as in FIGS. 2 and 5, and it will be seen that this is necessarily accompanied by downward deflection of the tab 15 with respect to the flap 14 about a hinge line at or near the leading edge of the tab.

The only portions of the mechanism of this arrangement which protrude are the rear ends of the upper runs of the chains 26, and the sprockets 28, which are covered by fairings 45. Should this protrusion be unacceptable the chain operation can be replaced by another push-pull mechanism which would not extend beyond the wing profile.

The advantages of the arrangement as described above are primarily two-fold. Aerodynamically, unspoilt flap and tab surfaces can be maintained both in the extended and retracted positions. Furthermore the slot 17 formed between the flap 14 and the tab 15 is obstructed only by a pair of rods 35, no further mechanism being required to control the position and attitude of the tab. The mechanical advantages lie in the simplicity which in turn will make it possible to provide for minimum backlash without either resorting to any unrealistic manufacturing tolerances or making it necessary to have a mechanism so large that it will project significantly beyond the profile of the wing.

It will be appreciated that the illustrations are diagrammatic. For instance, the device 39 shown to impart a twisting movement to the rod 35 may be replaced by any of the many ways of achieving such a result; and no details have been shown of the construction of the hinge by which the nose of the tab 15 is attached to its mounting rod. Also, while at least two mountings are required per tab in order to locate the tab relative to the flap, only one of these needs to have a cranked extension 40. The optimum arrangement to be used will depend on the stiffness of the structure employed and it might be that for each tab there would be three or four locating stations each including a cranked rod 35.

We claim:

1. An aircraft high lift flap assembly comprising a wing, a main flap mounted at the trailing portion of said wing and arranged to be extended rearward from the wing trailing edge and deflected downward, and a tab mounted at the trailing edge of said main flap which tab is normally an undeflected rearward continuation of said main flap but becomes separated from said flap to form a slot and is deflected downward with respect to said flap when said flap is at full extension, characterized by mechanical push-pull members operatively connected between said wing and said main flap to extend and retract said main flap with said tab thereon, push-pull rods provided within said main flap whereby they move rearward with said flap when said flap is extended, each said push-pull rod being mounted within said main flap for both endwise travel relatively to said flap in a generally fore and aft direction and angular movement about the longitudinal axis of the rod, a tab-operating connection from said wing to the forward end of said push-pull rod within said flap whereby said push-pull rod is shifted endwise relatively to said flap when said flap is extended, rod-twisting means causing said push-pull rod to turn about its longitudinal axis as it is shifted endwise by said tab-operating connection, and an operative connection between the aft end of said rod and said tab whereby rearward endwise travel of said rod relatively to said flap produces rearward movement of said tab with respect to said flap, and angular movement of said rod produces deflection of said tab with respect to said flap.

2. An assembly according to claim 1, wherein said operative connection between said push-pull rod and said tab comprises a cranked rearward extension of said rod so that as the rod travels endwise to produce rearward movement of the tab the simultaneous turning of the cranked extension deflects the tab.

3. An assembly according to claim 2, wherein the nose of said tab is mounted on the rear portion of said push-pull rod by means of a ball joint at the forward end of said cranked extension of the rod, and a ball on the rear end of said extension is received in a substantially horizontal spanwise-extending channel in the tab.

4. An assembly according to claim 1, wherein said tab-operating connection comprises a lever pivotally-connected to the forward end of said push-pull rod, which lever engages an abutment surface on the wing as said flap approaches a condition of full rearward extension whereby said lever is turned to shift said rod endwise.

5. An assembly according to claim 4, wherein said lever is pivotally mounted on the flap and has arms extending above and below the pivot, one arm carrying an abutment pin while the other arm is coupled to said push-pull rod by a ball joint.

6. An assembly according to claim 4, wherein the flap is mounted on the wing by means of runners on the flap engaged in fore-and-aft extending guide channels in the wing, and said abutment surface on the wing is provided by the rear end of one of said guide channels.

7. An assembly according to claim 1, wherein said push-pull members extending and retracting said flap comprise endless chains running on sprockets on the wing.

References Cited

UNITED STATES PATENTS 2,137,879 11/1938 Ksoll.
2,404,956 7/1946 Gouge.
2,779,555 1/1957 Danielson.
2,908,454 10/1959 De Wolff.

MILTON BUCHLER, Primary Examiner

JEFFREY L. FORMAN, Assistant Examiner